J. ORTH.
ELECTRICAL APPARATUS.
APPLICATION FILED JUNE 3, 1915.

1,275,083.

Patented Aug. 6, 1918.

Inventor:
Johannes Orth,
by Alma Davis
His Attorney.

UNITED STATES PATENT OFFICE.

JOHANNES ORTH, OF BERLIN, GERMANY, ASSIGNOR TO GENERAL ELECTRIC COMPANY, A CORPORATION OF NEW YORK.

ELECTRICAL APPARATUS.

1,275,083.  Specification of Letters Patent.  Patented Aug. 6, 1918.

Application filed June 3, 1915. Serial No. 31,983.

*To all whom it may concern:*

Be it known that I, JOHANNES ORTH, a subject of the German Emperor, residing at Berlin, Germany, have invented certain new and useful Improvements in Electrical Apparatus, of which the following is a specification.

This invention relates to a terminal connection device for electrical apparatus and has for one of its objects the provision of means whereby the terminals of such apparatus are well insulated and whereby they may be conveniently interconnected in various ways as conditions require. It is particularly adapted for those types of electrical apparatus wherein it is sometimes desired to vary the voltage by varying the number of units or windings in series, as for example transformers which are provided with numerous taps connected to the windings in order that the voltage may be varied as conditions demand.

My invention is especially adapted for electrical apparatus provided with a protective coil which should always be in circuit, such as a highly insulated coil designed to withstand surges or abnormal rushes of current in the circuit, and it is another of the objects of my invention to provide a device whereby the voltage of such apparatus may be easily changed without changing the effective length of the protective coil.

Figure 1:
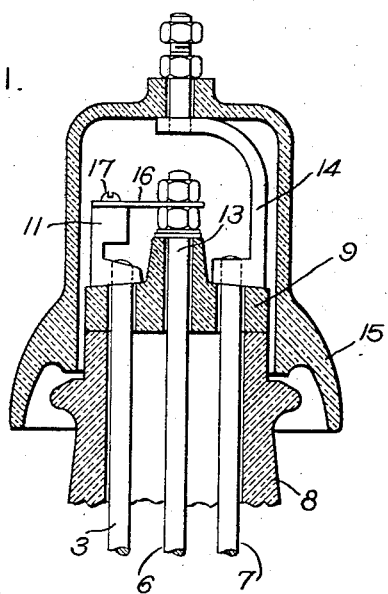
Figure 2:
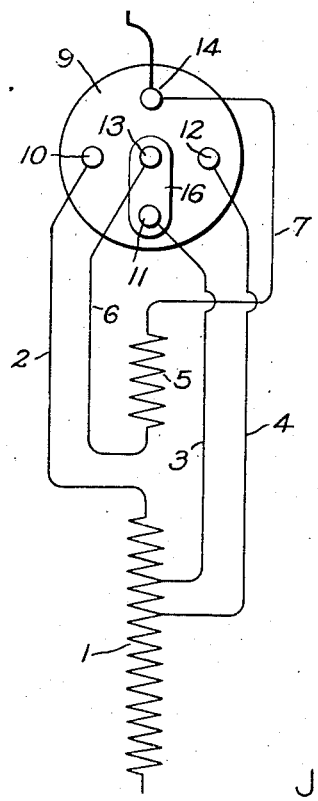

My invention will be more readily understood upon reference to the accompanying drawing in which Figure 1 is a sectional view through a terminal connection device embodying my invention; and Fig. 2 is a diagram illustrating an arrangement of electrical windings and their connection to a similar terminal device.

In the drawings, 1, is the main winding of an electrical apparatus, such as a transformer, provided with a main lead 2 and the tap leads 3 and 4; 5 is a protective winding having the leads 6 and 7. The terminal connection device comprises the insulator body 8 provided at its outer end with the terminal board 9; through these two members extend the leads of the windings and on the terminal board 9 are mounted the similar terminals 10, 11 and 12 of the leads of the main winding, and also the terminals 13 and 14 of the protective winding leads 6 and 7.

The terminal 14 of the protective winding is the leading-in terminal of the apparatus, and this terminal extends through and supports the insulating cover 15 which incloses and protects the terminal board and terminals. The other terminal 13 of the protective winding 5 is located at the center of the terminal board 9 and spaced from it at equal distances are the terminals 10, 11 and 12 of the main winding.

The common terminal 13 of the protective winding is arranged for connection to any one of the terminals of the main winding by means of the link 16 and is shown as being connected by means of this link to the tap terminal 11 of the main winding. When it is desired to connect the windings for higher or for lower voltages, the terminal 13 of the protective windings may be easily connected to either of the other terminals 10 or 12 of the main winding as conditions require by simply removing the cover 15 and the screw 17 which secures the link 16 to the terminal 11 and changing the position of the link.

It will, of course, be understood that while I have shown and described my invention as embodied in a preferred form, I do not wish to limit my invention to the specific construction and arrangement shown, but aim in the appended claims to cover all embodiments which do not depart from the spirit and scope of my invention.

What I claim as new and desire to secure by Letters Patent of the United States, is,—

1. An inclosed connection device comprising in combination a body member of insulating material, a plurality of leads extending through the body member, terminals for said leads comprising a main leading-in terminal a common terminal and a plurality of selective terminals spaced from said common terminal, a link for connecting said common terminal to any one of the selective terminals, and a cap or cover which incloses the terminals and through which the leading-in terminal extends.

2. An inclosed connection device comprising in combination a tubular body member, a terminal board at one end thereof, and a cover inclosing said terminal board and the end of the body member, all of which parts being of suitable insulating material, terminals mounted on the terminal board comprising a main terminal which extends through and supports said cover, a common terminal, and a plurality of selective terminals spaced at equal distances from said common terminal, and a link for connecting said common terminal to any one of the selective terminals.

In witness whereof, I have hereunto set my hand this 29th day of April 1915.

JOHANNES ORTH.

Witnesses:
WOLDEMAR HAUPT,
HENRY HASPER.